Jan. 15, 1929.
Re. 17,191
C. L. DALY
SHOE
Original Filed April 4, 1925
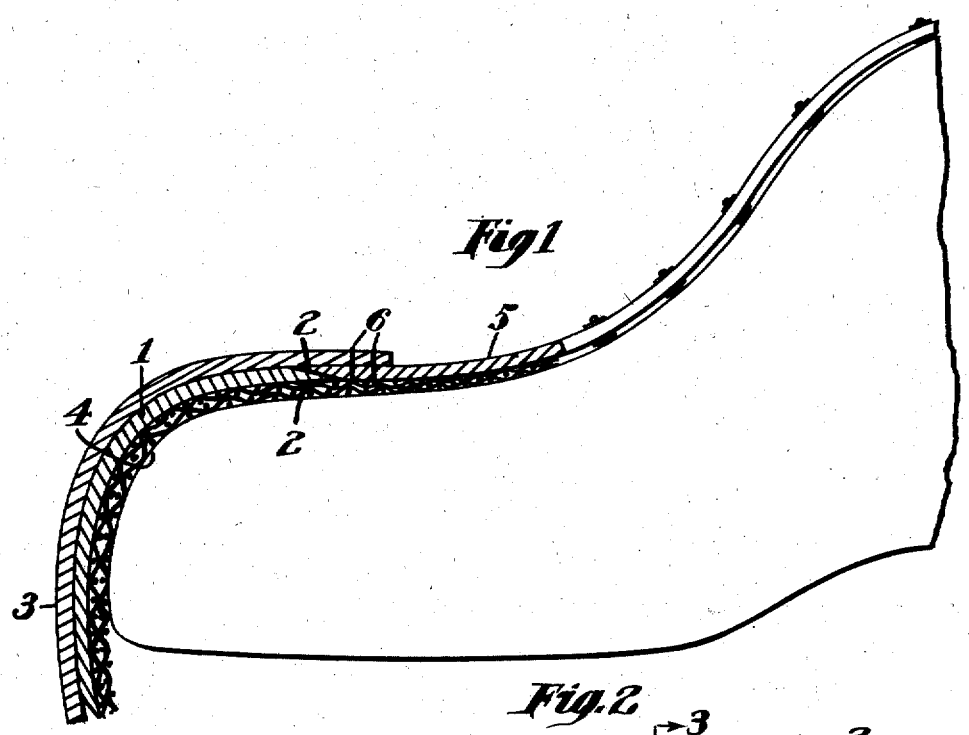
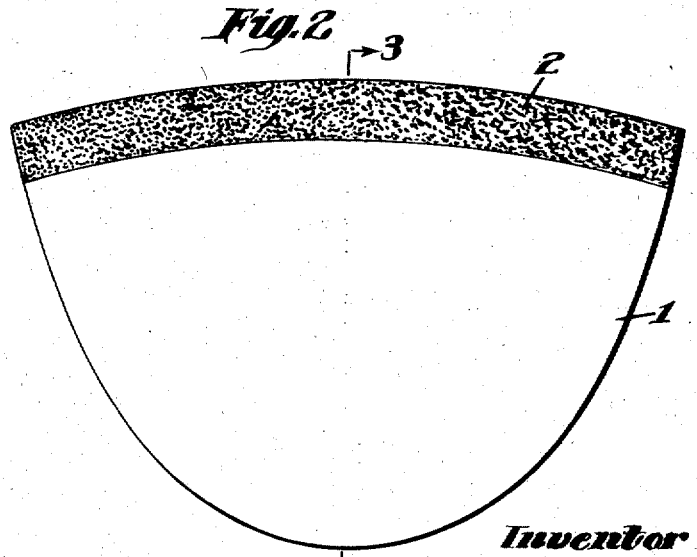
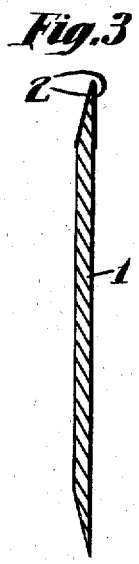
Inventor
Charles L. Daly
By Ellis Spear Jr.
Attorney Reissued Jan. 15, 1929. Re. 17,191

UNITED STATES PATENT OFFICE.

CHARLES LEO DALY, OF BROCKTON, MASSACHUSETTS.

SHOE.

Original No. 1,574,872, dated March 2, 1926, Serial No. 20,647, filed April 4, 1925. Application for reissue filed July 21, 1926. Serial No. 124,079.

This invention relates to the manufacture of box toe shoes, and particularly to a box toe shoe of the type wherein the box toe blank is a thermoplastic material which is normally hard and stiff so that it may be conveniently handled, but which is adapted to be softened by heat treatment to permit it to be shaped and stitched to the vamp and toe tip.

Certain practical difficulties are encountered with a box toe blank of this character, particularly in the matter of stitching the thermo-plastic blank to the upper. This blank is usually of felt impregnated with a thermo-plastic material, generally of bituminous or asphaltic origin, which must at once be sufficiently hard to give the requisite stiffness and rigidity to the toe when formed and yet sufficiently adhesive so that when softened by heat, it will properly adhere to the upper.

In order to obtain the required adhesiveness under heat treatment, it is necessary to sacrifice some degree of stiffness. The condition of being too sticky, however, is detrimental in that any excessive stickiness makes difficult the operation of scarfing the box toe blank after it has been cut from the sheet and also tends to interfere with the free penetration of the needles which stitch the toe tip and vamp to the box toe blank.

Moreover, with a condition of overstickiness, the box toe blank, when softened by heat treatment, tends to adhere throughout its entire area to the doubler and tip so that in lasting around the toe, the several thicknesses or layers frequently adhere to each other and cannot be individually pleated about the toe as they should be. Furthermore, the adhesive clings to the lasting pincers, and the operator has to stop and scrape off the adhesive with a knife blade or the like. While this is being done, the box toe blank cools and hardens again, and has to be reheated before it can be properly lasted to the toe tip and vamp.

On the other hand, in order to obtain the requisite stiffness in the box toe blank, it is necessary to sacrifice some degree of adhesiveness. The condition of being too hard and not sufficiently sticky, however, makes for difficulty in the stitching operation, in that the needles will not easily penetrate the extremely stiff box toe blank, and moreover, where not sufficiently sticky, the blank does not properly adhere to the toe tip when softened by heat treatment.

Furthermore, the operation of stitching a box toe blank of this type is both difficult and disagreeable, especially where the blank is filled with an excess of rosin, etc., and the stitchers dislike it and consequently are apt to be careless with the result that the stitch line is not always straight. Moreover, the needles do not readily penetrate the stiff box toe blank, and hence the stitch is apt to be coarse and unattractive.

It has been so difficult to obtain the proper medium between these two extremes of excessive hardness on the one hand and excessive stickiness on the other that the practice among many shoe manufacturers is to lay the box toe blanks loosely in the shoes rather than attempt to stitch them to the toe tip and lining. Where the box toe blank is laid, rather than stitched in place, the shoe is open to the disadvantage that the toe tip is free to slide on the box toe blank, producing wrinkles at the toe after the shoe has been worn for a while, and thus disfiguring the toe.

To the end therefore of avoiding the objections to prior practice while utilizing the standard box toe blanks now available, I have devised my present invention. According to one phase of my invention, the ordinary thermo-plastic box toe blank of commerce is provided along its tip line, on one or both faces with a coating material which is normally non-adhesive, but is capable of being rendered adhesive prior to lasting so as to readily adhere to the toe tip and vamp of the shoe, and of itself unite said parts without necessity of stitching them to the box toe blank. This coating is preferably a low melting asphalt, but it may be a combination of asphalt, wax-tailings and the like.

Such a coating would be thermo-adhesive; that is, it would soften by and during the same heat application which softens the box toe blank generally for shaping, and due to the fact that it readily softens and itself constitutes the sole connection between the box toe blank, vamp and toe tip, the box toe blank generally may be of greater stiffness than was heretofore practicable where the blank had to be stitched to the vamp and toe tip at their overlap.

My invention, therefore, not only avoids the objections which prevail where the box toe blank has been stitched to the vamp and toe tip, but also avoids the objections to the loosely laid box toe blank. In my box toe blank, the adhesive zone is relatively small in area and not only adheres to the rear end of the toe tip so as to prevent the tip from moving forwardly and wrinkling when grasped by the pincers of the pulling over machine, but permits the several layers or thicknesses of material to be individually pleated about the toe instead of being laid in together as happens with the entirely adhesive blank.

My invention thus contemplates an unstitched box toe blank to which has been applied an external band of material which upon treatment, becomes sufficiently sticky to adhere to the toe tip and vamp of the shoe when the blank is laid in the shoe and of itself adhesively to connect the blank along its tip line to said parts.

The manner of practicing my invention, together with a characteristic embodiment thereof, well illustrating the principles involved, is described and shown in the accompanying specification and drawings, and the features of novelty are particularly pointed out in the appended claims. Throughout the specification and drawings like reference numerals are correspondingly applied, and in the drawings:

Fig. 1 is a partial section through a lasted upper showing a box toe blank of standard type treated in accordance with my invention assembled therein, and Figs. 2 and 3 are detail views of said blank removed.

In commercial practice, thermo-plastic box toe blanks are usually manufactured in sheet form and the individual blanks subsequently struck therefrom. Each blank consists of a layer of felt or other fibrous material 1 impregnated with a thermo-plastic penetrant which is usually of bituminous origin so as to be normally hard and stiff, but capable of being softened under heat treatment to permit it to be bent to form.

One phase of my invention deals with a blank of this general character and consists in coating the rear end of the blank 1 on either side thereof with a suitable thermo-adhesive coating 2 which is normally hard and non-adhesive, but which may be softened by and during the same heat treatment which softens the blank generally for shaping and when sufficiently softened the coating 2 will adhere to the toe tip 3, lining and doubler 4 and vamp 5 and of itself unite said parts to the box toe blank without the necessity of stitching them through and through to said blank. The coating 2 may be extended forwardly of the blank to provide an adherent zone of sufficient width to insure that the blank will adhere properly to the toe tip and lining when these elements are stitched to the vamp by the lines of stitching 6 (Fig. 1).

The coating 2 is preferably of low melting asphalt, but it may be a combination of asphalt, wax-tailings or the like. When applied it soon hardens and may be conveniently handled without adhering to the fingers, but is readily softened by heat treatment so as to become tenaciously adherent. The coating 2 may be applied to the individual blanks in any suitable manner, as by passing the sheet from which the blanks are struck, or the individual blank itself through a tank containing a supply of melted asphalt.

In assembling my blank in the shoe, the blank in flat, stiff form is inserted between the toe tip and the lining of the lasted upper and the toe is then placed in a box toe heater. This heat treatment softens the thermoplastic material of the blank generally to a point wherein the blank may be shaped and pulled over, with the toe tip and lining. The same heat treatment also softens the thermo-adhesive coating 2 so that this adhesive band will adhere to the vamp when the toe is wiped thereby anchoring the box toe blank against movement relative to the toe tip and preventing the lining from pulling out with the last when the last is withdrawn from the formed toe, as frequently happens with a loosely-laid blank. In addition, the adhesive connection afforded by the band of adhesive 2 avoids the necessity of carrying the stitches 6 which unite the overlapping vamp and toe tip to each other into and through the box toe blank itself, and hence permits said blank to be stiffened to a degree not heretofore practicable. Preferably, the ends of the blank are scarfed, as shown in Fig. 1, to permit a smooth joint at the overlap of the toe tip and vamp.

Various modifications in the form and characteristics of my box toe blank and in the method and materials herein disclosed may obviously be resorted to within the spirit and scope of my invention as defined by the appended claims.

What I therefore claim and desire to secure by Letters Patent is:

1. As a new article of manufacture, a box toe blank impregnated with thermo-plastic material throughout substantially its entire extent, and an external band of thermo-adhesive material applied to said blank adjacent its tip line independently of and additionally to the original impregnation of the blank with the thermo-plastic material, said thermo-adhesive band being substantially different in composition and thermo-adhesiveness from the thermo-plastic impregnant, softening more quickly than said impregnant under the usual heat treatment of the blank, being stickier than said impregnant when softened, and after cooling adhering tenaciously to the toe tip and vamp of the shoe whereby to of itself adhesively connect the blank along its tip line only to said parts.

2. As a new article of manufacture, a box toe blank impregnated, with thermo-plastic material throughout substantially its entire extent, and an external relatively narrow thin band of thermo-adhesive material applied to both sides of said box toe blank adjacent its tip line independently of and additionally to the original impregnation of the blank with the thermo-plastic material, said thermo-adhesive band being substantially different in composition and thermo-adhesiveness from the thermo-plastic impregnant, softening more quickly under the usual heat treatment of the blank, being stickier than said impregnant when softened, and after cooling adhering tenaciously to the toe tip and vamp of the shoe whereby to of itself adhesively connect the blank along its tip line only to said parts.

3. As a new article of manufacture, a box toe blank consisting of a fibrous body impregnated with thermo plastic material throughout substantially its entire extent and having an external area of thermo-adhesive material applied to one face thereof independently and additionally to the original impregnation of the blank with the thermo-plastic material said thermo adhesive material being substantially different from the thermo plastic impregnant, in respect to its heat-resistant properties but softening under the same heat treatment which softens the blank generally for lasting and upon cooling adhering tenaciously to the toe tip and vamp of the shoe and of itelf adhesively connecting the blank to said parts.

In testimony whereof I affix my signature.

CHARLES L. DALY.